June 26, 1934.  O. NYGAARD  1,964,073
APPARATUS FOR GENERATING WATER GAS
Filed May 10, 1927
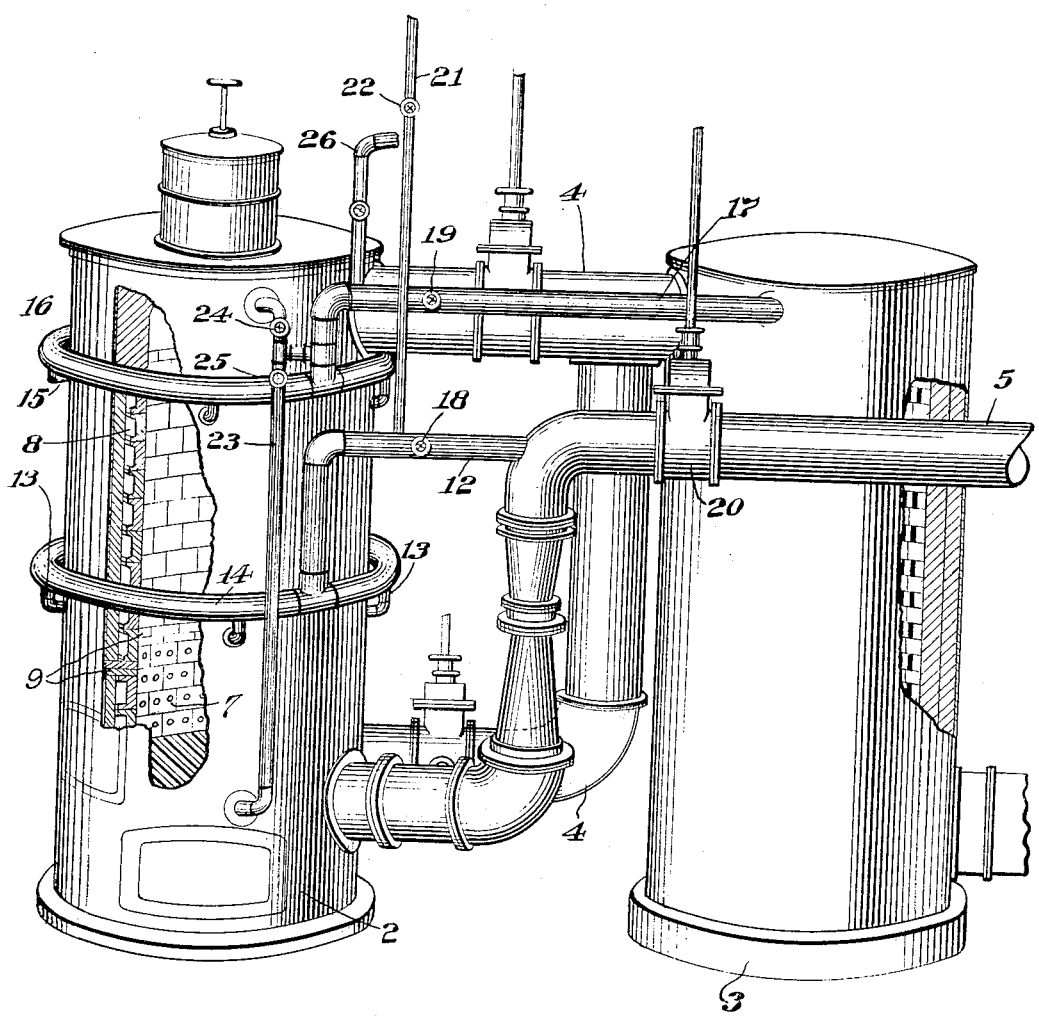
INVENTOR:
Oscar Nygaard,
BY
his ATTORNEY Patented June 26, 1934

1,964,073

UNITED STATES PATENT OFFICE 1,964,073

APPARATUS FOR GENERATING WATER GAS

Oscar Nygaard, Saugus, Mass., assignor to Bernitz Furnace Appliance Company, Boston, Mass., a corporation of Massachusetts Application May 10, 1927, Serial No. 190,325

3 Claims. (Cl. 48—64)

This invention relates to methods of and apparatus for generating water gas.

A typical gas generating unit of this character includes a generator, a carburetor into which the gases from the generator are discharged, and in which they are enriched by the addition of oil vapors, and a superheater into which the enriched gases flow from the carburetor. The carburetor is partly filled with checker brick around and through which the gases flow and from which they take up heat during the air "blow". In order to supply the necessary heat to the checker brick, it is customary to burn the incoming gases between "makes", air being admitted from the atmosphere to promote combustion. During the "make" or "run" steam is forced through the fuel bed where it decomposes and unites with constituents of the fuel in a manner well understood by those skilled in this art. It is one of the objects of the present invention to improve the efficiency of the apparatus both during the make or run and also during the air blow.

The very high temperatures which are created in the fuel bed tend to soften the refractory lining in the generator and cause clinker and slag to adhere to it. This action ultimately causes chipping of the lining with the result that the lining soon becomes worn out and must be removed. With a view to obviating this difficulty it has become within recent years a fairly common practice to use a hollow refractory lining in the generator and to circulate air through this lining to keep the lining sufficiently cool to prevent the adhesion of clinker to it. The present invention aims to utilize the excessive heat in the generator lining and to make this heat serve a useful purpose in the gas making process while at the same time holding the temperature of the lining below limits that would be injurious, by providing means for maintaining a positive circulation of a cooling medium within the wall during the complete cycle of operation of the generator.

The nature of the invention will be readily understood from the following description when read in connection with the accompanying drawing, and the novel features will be particularly pointed out in the appended claims.

In the drawing, the single figure is a perspective view showing somewhat diagrammatically in elevation with parts in section the general organization of an apparatus embodying this invention, those portions only of the apparatus being shown with which the invention is more especially concerned.

The apparatus illustrated comprises a water gas generator 2 and a carburetor 3 connected in the usual manner by pipes 4. These units may be of the usual construction except for certain features in the generator which will be described hereinafter. The usual air supply pipe 5 leads from a blower to the base of the generator 2 and discharges air underneath the grate.

It will be observed that the lining for the generator consists of two sections, a lower hollow section 7 and an upper hollow section 8, these two sections being separated from each other by intermediate stop courses 9 of brick. Preferably the facing of the lower section 7 consists of, or includes, hollow perforated blocks or bricks of some material which is highly resistant to fire, such as silicon carbide, while the facing of the upper section 8 consists of similar bricks or blocks which, however, have blank faces, or, in other words, are not perforated. With this arrangement a certain amount of the air discharged into the bottom of the generator finds its way up through the space in the lower lining section 7 and is discharged through the perforations in the blocks or bricks into the fuel bed. This air is prevented by the stop courses 9 of brick from flowing into the upper hollow section 8 of the lining. Also, since the facing of the upper section consists entirely of blank or non-perforated bricks or blocks, the annular air space provided in this part of the lining is separated from the gas and fuel chamber in the generator, no substantial flow of air or steam being permitted through the facing of this section.

According to the practice which preferably is followed in operating this apparatus, air is circulated through the upper section 8 of the lining during certain periods in the gas making cycle, this air thus becoming highly heated, and it is then used in burning the gases created in the generator for the purpose of supplying heat to the carburetor walls and the checker brick therein. At other periods in the gas making cycle steam is circulated through the lining 8 where it is superheated, and this superheated steam then is forced through the fuel bed where it is used in making gas. This invention contemplates superheating all of the steam used for making gas within the wall or walls of the generator before passing the steam to the interior thereof. When a secondary space is provided within the generator wall at the bottom of the same with openings through the lining between the space and the interior of the generator as shown in the drawing, steam superheated in the primary closed space will be still further superheated in its passage through the secondary space to the interior of the generator.

In order to create the circulation of air above mentioned through the lining section 8, a pipe 12 is arranged to lead air from the main pipe line 5 to a header 14 which encircles the generator, branch pipes or taps 13, conduct air from this header into the lower part of the air space in the upper lining section 8. Additional taps, one of which is shown at 15, conduct the heated air away from the upper part of this section to a header 16, from which it is carried by a pipe 17 into the upper part of the carburetor 3. The pipes 12 and 17 are equipped with valves 18 and 19, respectively, by means of which the air flow may be controlled and the entire supply of air through the pipe line 5 is under the control of the main valve 20, as is usual in apparatus of this type.

For the purpose of conducting steam into the upper lining section, a steam supply pipe 21 leads into the air pipe 12 at the generator side of the valve 18, this pipe being equipped with a valve 22 for controlling the flow of steam. The steam admitted to the pipe 12 follows the same path as the air in travelling through the upper lining section, and is discharged from the lining through the header 16 and short pipe connections to a vertical pipe 23 which leads into the generator both above the fuel bed and also below the grate, so that the steam which is superheated during its flow through the generator lining may be delivered either above or below the fuel bed, as desired. Upper and lower valves 24 and 25, respectively, are connected into this pipe and control the direction of flow of steam through it.

During the blow the steam is shut off and the valves 18 and 19 are opened so that air then flows through the upper section 8 of the generator lining and is discharged into the top of the carburetor where it mingles with the incoming gases discharged from the generator and promotes combustion. Due to the fact that this air is highly preheated, the efficiency of the unit is increased during this period. Also the heating of the interior of the carburetor is accomplished in a shorter time than heretofore and unconsumed gases are prevented from reaching the stack and being wasted. When the blow is completed the valves 18 and 19 are closed, the steam valve 22 is opened, and one of the valves 24 or 25 is opened, thus circulating it into the fuel bed where it is utilized in making gas. A substantial economy is effected here due to the fact that the steam is highly superheated before it is delivered to the fuel bed. This is particularly advantageous when heavy oils are sprayed on the fuel bed for enriching the blue gas as it aids in keeping the fuel bed in a hotter condition. An ample flow of air or steam is maintained through the upper lining section 8 at practically all times to keep the temperature of the lining below the point at which clinker will adhere to it. The invention thus affords ample protection for the generator lining, while at the same time delivering heat which is withdrawn from the lining to other parts of the apparatus where it serves a useful purpose.

In the apparatus shown provision has been made for utilizing the steam superheated in the lining either during the up run or the down run. In most gas generating plants, however, as now operated, the down run is longer and far more important from a gas making standpoint than is the up run. Consequently, it may be desirable in some installations to use the steam superheated in the generator lining only for the down run and such an arrangement is contemplated by this invention. It is also contemplated that the superheated steam may be used for other purposes than those described and still have the advantages obtained of holding the lining within the desired temperature limits. When such an arrangement is used a continuous circulation of the steam through the lining can be maintained, the steam being discharged through a pipe 26 leading to any desired point where the steam is to be used, such, for example, as heating feed water.

It will be understood that no effort has been made to illustrate the proper proportions of the pipes or to show a complete generating plant since these are matters well understood by those skilled in this art. It will also be evident that the invention may be embodied in other forms than that shown without departing from the spirit or scope thereof.

Having thus described my invention, what I desire to claim as new is:

1. In a water gas making apparatus the combination of a generator having a hollow refractory lining, a carburetor connected with said generator to receive gases therefrom, pipes for conducting air under pressure into the space in said lining whereby said air will be circulated through said space and heated, discharge passages for said air arranged to cause it to mix with said gases, means for conducting steam required for the production of gas to said apparatus, means including externally located inlet and outlet headers for conducting all of such steam into said space in said lining, to cause said steam to circulate through the lining and then be discharged into the fuel bed in the generator on a water gas down-run, and valves for controlling the flow of air and steam from said pipes.

2. In a water gas producing apparatus, the combination of a generator having a hollow refractory lining, a carburetor connected with said generator to receive gases therefrom, pipes for conducting air to be used in said carburetor into the space in said lining to preheat said air before it is delivered to the carburetor and for delivering said air to the carburetor, means for conducting steam into said space in said lining to cause said steam to be superheated in the lining, means for discharging all of the steam so superheated into said generator above the fuel bed, and means to draw off both up and down run water gas.

3. In a water gas set, the combination of a carburetor and a generator provided with a hollow refractory lining divided into an upper chamber and a separate lower chamber, the lining forming the lower chamber being perforated, means for circulating gaseous fluids through said upper chamber, comprising an inlet header and an outlet header both externally mounted on said generator, and valved pipes connecting said outlet header with the top and bottom of said generator and with the top of said carburetor.

OSCAR NYGAARD.